United States Patent [19]

Boldridge, Jr.

[11] 4,281,313
[45] Jul. 28, 1981

[54] BAROOPTICAL VERIFICATION APPARATUS

[75] Inventor: Austin G. Boldridge, Jr., Freehold, N.J.

[73] Assignee: Conversational Systems, Inc., New York, N.Y.

[21] Appl. No.: 48,804

[22] Filed: Jun. 15, 1979

[51] Int. Cl.³ .............................................. G06K 9/20
[52] U.S. Cl. ........................... 340/146.3 SY; 178/18; 250/227; 340/365 P
[58] Field of Search ............... 178/18; 340/146.3 SY, 340/365 P, 149 R; 250/227; 361/283; 72/432 R

[56] References Cited

U.S. PATENT DOCUMENTS

| 3,128,340 | 4/1964 | Harmon | 178/18 |
| 3,255,357 | 6/1966 | Kapany et al. | 250/227 |
| 3,467,774 | 9/1969 | Bryant | 250/227 |
| 3,478,220 | 11/1969 | Milroy | 340/365 P |
| 3,860,754 | 1/1975 | Johnson et al. | 178/18 |
| 4,035,768 | 7/1977 | Boldridge, Jr. et al. | 361/283 |

Primary Examiner—Leo H. Boudreau
Attorney, Agent, or Firm—Hane, Roberts, Spiecens & Cohen

[57] ABSTRACT

Apparatus used in identifying a person by means of pressure patterns and X-Y movements of a stylus associated with a signature includes first and second spaced and parallel planar conductor means with an excutcheon means for defining on an exposed surface of one of the elements to provide a writing surface for a user who, by means of a stylus, exerts a varying pressure pattern via the lamina onto one of the elements to produce a varying capacitance signal while at the same time interrupting light paths to produce X-Y coordinate signals.

12 Claims, 4 Drawing Figures

BAROOPTICAL VERIFICATION APPARATUS

BACKGROUND OF THE INVENTION

This invention pertains to personal identification verifier apparatus and more particularly to such apparatus which utilizes signature pressure patterns and stylus movements in the identification process.

In many fields and particularly in personal identification fields such as access control, charge account, banking and credit card operations it is desirable to convert person's signature to electrical signals which are then used in a verification and/or identification process. It has been found that when a person writes his signature he not only generates a unique visual pattern on a record medium, but he also generates a unique pressure pattern. The uniqueness of the pressure pattern has been exploited to build verification systems. Typical systems are disclosed in U.S. Pat. Nos. 3,480,911, 3,563,097 and 3,618,019, for example.

Some of these systems use pens with strain gauge transducers therein while other systems employ pressure sensitive writing surfaces. The transducer pens generally are very expensive and delicate and suffer low gauge factor/sensitivity and significant hysteresis. In fact, most of such pens break down when subjected to a high impact shock which occurs from the forceful dotting of an "i." In addition, the pen and associated wire are difficult to shield electromagnetically and are subject to data interception. Finally, the pen which dangles from the end of a cable is subject to theft and vandalism.

On the other hand, pressure sensitive tablets, while not being subjected to the same set of problems, create their own set. In particular, the major problem is associated with the nonlinearity of the generated signals because of the extended writing surface. In order to linearize the signal, complex and delicate systems using springs, strain gauges and the like are employed. Even with these expensive solutions, such devices still suffer from relatively high hysteresis and marginal natural frequency.

In a previous attempt to solve these problems I invented an improved transducer system which is the subject matter of my U.S. Pat. No. 4,035,768, issued July 12, 1977. While that system performed with high accuracy it created a demand for even higher accuracies by measuring more variables.

SUMMARY OF THE INVENTION

It is a general object of the invention to provide improved personal identification verifier apparatus.

It is another object of the invention to provide such apparatus which is more reliable than presently available apparatus.

It is a further object of the invention to provide such apparatus which is extremely linear over its entire operating range while instantaneously measuring the three coordinates required for personal identification.

These and other objects of the invention are satisfied by apparatus which includes first and second opposed planar conductor means. There is also provided a stylus adapted to be gripped by the person whose identification is to be verified for writing on the upper surface of one of the planar conductor means. A utilization means sensitive to changes in the electrical capacitance resulting from the change in separation of the planar conductor means in response to the pressure exerted by the stylus is connected to the conductor elements. In addition optical means simultaneously senses the planar position of the stylus on the planar conductor means to give position indicating signals to the utilization device whereby a combined three dimensional indication of the movement can be obtained.

BRIEF DESCRIPTION OF THE INVENTION

Other objects, the features and advantages of the invention will be apparent from the following detailed description of the invention when read with the accompanying drawing which shows by way of example, and not limitation, several embodiments of the invention. In the drawing.

DESCRIPTION OF PREFERRED EMBODIMENTS

Figure 1:
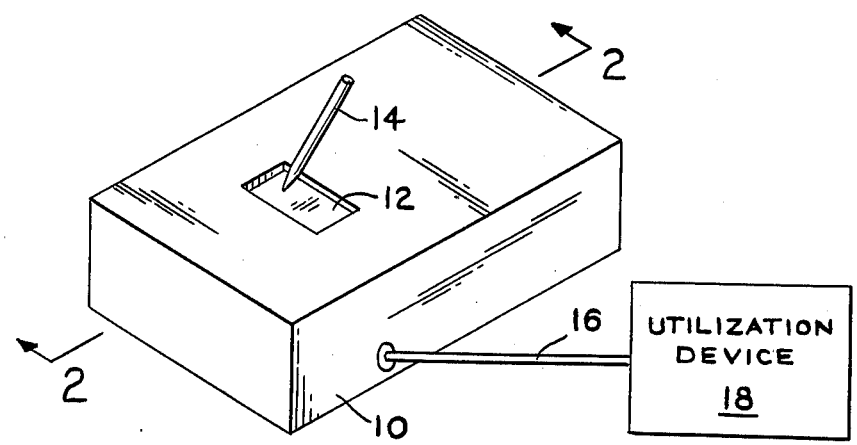
FIG. 1 is a perspective view of the pressure sensitive verifier apparatus according to the invention.

In FIG. 1 there is shown a verifier system including personal verifier apparatus having a housing 10 supporting a pressure sensitive writing tablet 12 and a stylus 14. When a user writes his signature on the writing surface of tablet 12, signals are generated which are fed via cable 16 to utilization device 18.

Figure 2:
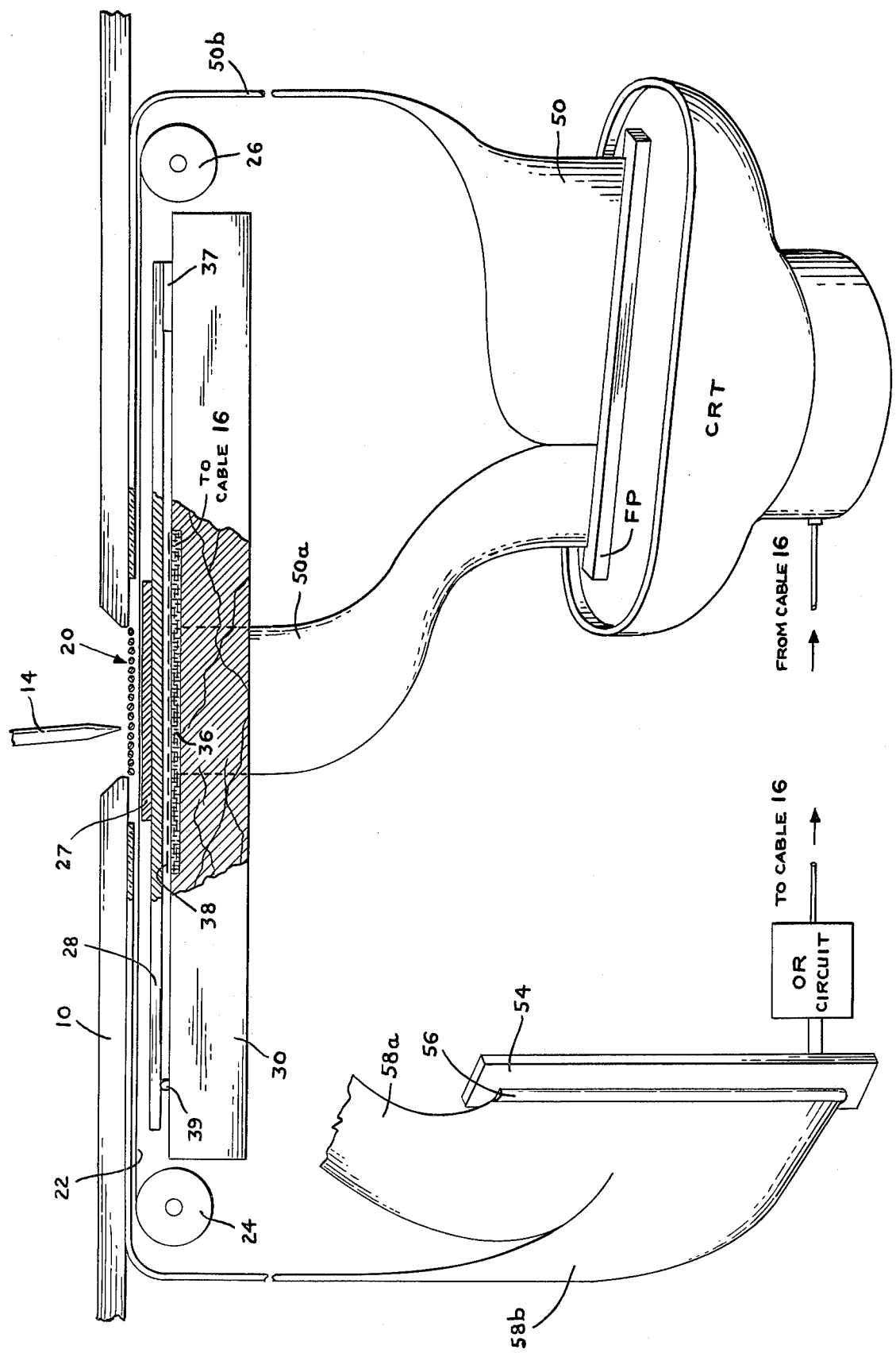
FIG. 2 is a cross-sectional view taken along the line 2—2 of FIG. 1 according to one embodiment of the invention.

More particularly, according to the embodiment of FIG. 2 the apparatus comprises the housing with escutcheon 10 having a writing window 20. Extending across writing window 20 is a record medium such as paper or Mylar tape 22 which is moved by means (not shown) connected to reels 24 and 26. Tape 22 is a record medium upon which a user will write his signature to provide a visual record when stylus 14 is a ball point pen or the like. Below tape 22 within the region of window 20 the writing tablet 12 comprises a sheet or lamina writing pad 27 in the form of a moderately yieldable elastomeric material to provide a resilient writing surface which performs a further function hereinafter more fully described. A support structure (not shown) supports a base plate 30 preferably of fused quartz. The support structure is rigidly connected to the escutcheon of housing 10 so that the escutcheon and base plate float together. On the top surface of base plate 30 is fixed a layer 36 of electrically conductive material such as a vaporized layer of gold. A connector is fixed to the gold layer for connection to cable 16 of FIG. 1. On top of layer 36 there is a sheet 38 of dielectric material such as Mylar film. At one end of base plate 30 is rigidly fixed a spacer 37 and fixed to the other end thereof is foot rest point edge 39. A metallic plate 28 has one end rigidly fixed to spacer 37 and has its other end freely resting on edge 39. Thus a parellel plate capacitor is obtained from layer 36 and plate 28. The role of sheet 38 is to increase the capacitance between the layer 36 and plate 28 while still providing a workable spacing. It should be noted that in spite of sheet 38 there is still an air gap between the layer 36 and plate 28. When pressure is exerted on pad 27 the spacing between plate 28 and layer 36 changes, thus changing the capacitance.

It should be noted that the plate 28 can be considered as a beam having one clamped end and a remote floating end. The use of one clamped end and one floating end is a definite improvement over the transducer disclosed in my above-cited U.S. Pat. No. 4,035,768 in that temperature coefficients and hysteresis phenomenon approach zero. Lower stresses and greater deflection sensitivity for a given plate thickness are obtained. In addition the dynamic capacitance range is increased. Up until now the pressure portion of the transducer has been described. The optical part will now be discussed.

Figure 3:
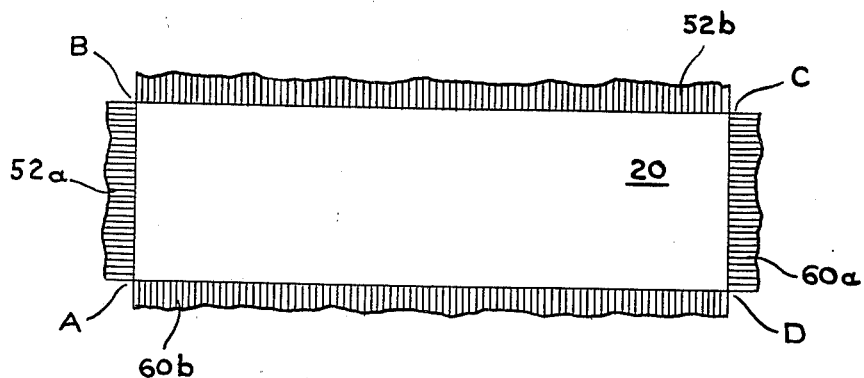
FIG. 3 is a schematic top view with the escutcheon removed to show the optical system in more detail.

In FIG. 3 there is shown a schematic top view of the signature area or writing window 20. The window is framed underneath the escutcheon 10 by the ends of ribbons of optical fibers. In FIG. 3 light transmitting ends 52a of one ribbon are positioned along one edge of the window 20 while light receiving ends 60a of another ribbon are positioned along an opposite edge of the window 20. Similarly light transmitting ends 52b of a ribbon are positioned along a further edge orthogonal to said one edge; and light receiving ends 60b of another ribbon are positioned along the edge opposite to said further edge. In operation the optical fibres having ends 52a are sequentially illuminated in the direction from A to B and then the optical fibres having ends 52b are sequentially energized in the direction from B to C. By means of focusing techniques hereinafter more fully described herein can be assumed the light travels across the area with minimum diffusion. Thus whenever the stylus is at a point in the area, there will be two optical fibres one in each of the receiving ribbons which will receive less light. Thus by knowing which bundles don't receive a given amount of light one can tell the X-Y position of the stylus.

A means for illuminating the ribbons and for actually sensing for the light is shown in FIG. 2. A cathode ray tube system CRT with a fibre optics face plate FP is controlled to generate a straight line trace. A suitable cathode-ray tube system is a Thomas Electronics 6M.136PMFO series cathode ray tube system. Optically connected to the face plate FP by means of glued butting is a ribbon 50 of optical fibers such as Crofon ribbon manufactured by DUPONT. The ribbon is partially bifurcated with one branch 50a having the ends 52a in FIG. 3 and the other branch 50b having the ends 52b in FIG. 3.

Similarly, there is a linear array of photodiodes 54 connected by optical gain means 56 hereinafter described to ends of the ribbon of optical fibres 58 which can be bifurcated with one branch 58a connected to ends 60a in FIG. 3 and another branch 58b connected to ends 60b in FIG. 3. A suitable photodiode array is a set of a number of Fairchild FPT diodes fixed in a line.

Figure 4:
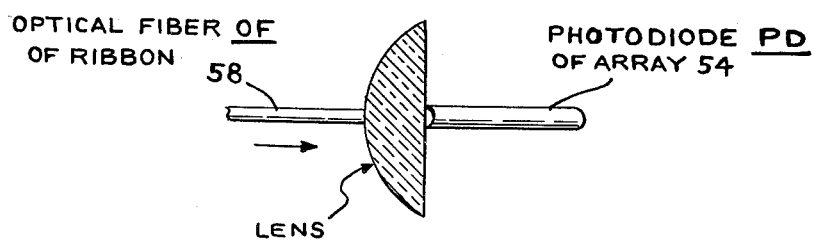
FIG. 4 shows the details of an optical receiver.

In FIG. 4 there is shown the details of the connection of the fibres of ribbon 58 to the diode array 54. In general the end of an optical fiber OF is glued to the cylindrical surface of semi-cylindrical lens LENS. Preferably the fiber is positioned radial to the lens surface. At the center of curvature of the lens there is positioned one of the photodiode PD of the linear array of similar photodiode. It should be noted that there is one elongated cylindrical lens for all optical fibers, but a different photodiode is associated with and aimed at the end of each receiving optical fiber. With such a lens 10x magnification can be obtained. Furthermore, difusion is minimized by setting back the ends of the transmitting optical fibers a fraction of an inch from the edge of the escutcheon as seen in FIG. 3. This technique creates an Aires summation lens which in effect focuses the beams.

While only one embodiment of the invention has been shown and described in detail there will now be obvious to those skilled in the art many modifications and variations satisfying many or all other objects of the invention but which does not depart from the point thereof as defined by the appended claims. An alternate approach to the fiber-optic CRT array shown is the CCD (capacitor charge device) shift/pulsed LED source.

What is claimed is:

1. Barooptical identification verifier apparatus comprising: a first planar conductor means comprising a first plate of non-conductive material having a surface opposite said second planar conductor means upon a part of said first plate is deposited a layer of conductive material; a second planar conductor means opposite said first planar conductor means comprising a second plate of conductive material; spacer means for rigidly fixing in spaced parallel relationship one end of said second plate to a corresponding end of said first plate and a foot rest point edge means fixed to the other end of said first plate for slidingly supporting the corresponding other end of said first plate; a stylus adapted to be gripped by the person whose identification is to be verified for moving over said second planar conductor means; optical means for indicating the position of said stylus on said second planar conductor means; and a utilization means connected to said planar conductor means and responsive to the changes in the electrical capacitance of said planar conductor means, said utilization means also being connected to said optical means and responsive to indications of said stylus whereby combined three dimensional indications of the movement of the stylus can be obtained.

2. The apparatus of claim 1 further comprising escutcheon means for demarcating a stylus movement area on said second planar conductor means and wherein said optical means comprises a linear array of sequentially illuminated light sources disposed above said second planar conductor means and near at least one edge of said area and a linear array of light sensors similarly disposed above said second planar conductor means on an opposite edge of said area for receiving light from said light sources.

3. The apparatus of claim 2 wherein said array of light sources comprises a flat ribbon of optical fibers having first ends disposed along said one edge and second ends which are sequentially energized, and said array of light sensors comprises another flat ribbon of optical fibers having first ends disposed along said opposite edge and a plurality of photosensitive means optically coupled to said second ends.

4. The apparatus of claim 3 further comprising a semi cylindrical lens and wherein the second ends of the optical fibers of said other ribbon are fixed to the curved surface of said semi cylindrical lens and said photosensitive means are photodiodes positioned along the central axis of said lens.

5. The apparatus of claim 2 further comprising escutcheon means for demarcating a stylus movement area which is rectangular on said second planar conductor means and wherein said optical means comprises a first flat ribbon of optical fibers, first ends of said ribbon being disposed in the region of at least one of the sides of said area, a light means for periodically sweeping a line of light, said second ends being affixed to said light means along the region where the line of light is swept.

6. The apparatus of claim 1, wherein said second plate is rigidly fixed to said escutcheon means.

7. The apparatus of claim 6 wherein a laminar of elastomeric material is fixed to the surface of said second planar conductor means remote from said first planar conductor means.

8. The apparatus of claim 6 further comprising a sheet of dielectric material disposed in the space between said first and second planar conductor means.

9. The apparatus of claim 8 wherein said stylus is a pen and further comprising a record medium resting on top of said first planar conductor means.

10. Identification apparatus comprising: a rectangularly demarcated writing area; and optical means for indicating the position of a stylus on the area, said optical means comprises a linear array of sequentially illuminated light sources near at least one edge of said area in the form of a flat ribbon of optical fibers having first ends disposed along said one edge and second ends which are sequentially energized, and a linear array of light sensors similarly disposed on an opposite edge of said area for receiving light from said light source, said array of light sensors comprises a semi-cylindrical lens and another flat ribbon of optical fibers having first ends disposed along said opposite edge and the second ends of the optical fibers of said other ribbon being fixed to the curved surface of said semi-cylindrical lens and a plurality of photodiodes positioned along the central axis of said lens.

11. Identification apparatus comprising: a rectangularly demarcated writing area; and optical means for indicating the position of a stylus on the area, said optical means comprises a first flat ribbon of optical fibers which is partially bifurcated, first ends of said ribbon being disposed in the region of first and second orthogonal sides of said area, a cathode-ray tube means for periodically sweeping a line of light on the face thereof said second ends being affixed on the face of said cathode-ray tube means along the region where the line of light is swept, and a linear array of light sensors similarly disposed in the region of the sides of said area opposite said first and second sides for receiving light from said light source.

12. Personal identification verifier apparatus comprising a first planar conductor means, a base plate, a second planar conductor means on said base plate and parallel to and opposite said first planar conductor means, spacer means for rigidly fixing one end of said first planar conductor means to a first end of said base plate, and a foot rest point edge fixed to the other end of said base plate for slidingly supporting the other end of said first planar conductor means, a sheet of dielectric material disposed in the space between said first and second planar conductor means, said sheet having a thickness which is less than the spacing between said planar conductor elements whereby there is an air gap between said planar conductor means, a lamina of elastomeric material fixed on a portion of the surface of said first planar conductor element remote from said second planar means to provide a writing surface, a housing enclosing said first and second planar conductor means, said housing being provided with an opening opposite said lamina of elastomeric material, a visual record medium spanning said first planar conductor means and overlying said lamina, a stylus adapted to be gripped by the person whose identification is to be verified for writing on the portion of the record medium opposite said lamina, and a utilization means connected to said first and second planar conductor means and responsive to the changes in electrical capacitance as the thickness of the air gap changes in response to forces exerted on said first planar conductor means via said lamina and said record medium by said stylus when a person writes on said record medium.

* * * * *